United States Patent
Adams et al.

(10) Patent No.: US 6,186,337 B1
(45) Date of Patent: Feb. 13, 2001

(54) DUAL SCREEN ELEMENT HAVING UPPER SCALPING SCREEN ADHERED TO CRESTS OF CORRUGATED LOWER SCREEN

(75) Inventors: Thomas C. Adams, Hockley; Loyd R. King, Montgomery, both of TX (US)

(73) Assignee: Tuboscope I/P, Inc., Houston, TX (US)

( * ) Notice: Under 35 U.S.C. 154(b), the term of this patent shall be extended for 0 days.

(21) Appl. No.: 09/183,004

(22) Filed: Oct. 30, 1998

(51) Int. Cl.$^7$ .................. B07B 1/49; B07B 1/28
(52) U.S. Cl. .......... 209/401; 209/392; 209/403; 209/269
(58) Field of Search ................... 209/273, 392, 209/393, 397, 309, 363, 315, 319, 400, 401, 403, 408, 409, 411, 269

(56) References Cited

U.S. PATENT DOCUMENTS

| | | |
|---|---|---|
| 40,242 | 10/1863 | Capell . |
| D. 366,040 | 1/1996 | Leone, Sr. et al. ........... D15/147 |
| D. 377,656 | 1/1997 | Leone et al. ............. D15/147 |
| 500,302 | 6/1893 | Stoeckel et al. . |
| 943,869 * | 9/1909 | Gaston ................... 209/397 |
| 964,897 | 7/1910 | Bryant . |
| 984,866 | 2/1911 | Tate . |
| 1,027,734 * | 10/1912 | Hunnicutt ............... 209/315 |
| 2,061,850 | 11/1936 | Roberts . |
| 2,082,513 | 6/1937 | Roberts . |
| 3,057,481 | 10/1962 | Pall . |
| 3,900,628 * | 8/1975 | Stewart ................. 209/397 |
| 4,033,865 | 7/1977 | Derrick, Jr. ............ 209/275 |
| 4,140,630 * | 2/1979 | Scarlett et al. .......... 209/313 |
| 4,541,933 | 9/1985 | Arnold et al. ........... 210/780 |
| 4,575,421 | 3/1986 | Derrick et al. .......... 209/397 |
| 4,634,535 | 1/1987 | Lott .................... 210/780 |
| 4,696,751 * | 9/1987 | Eifling ................. 210/780 |
| 4,728,422 | 3/1988 | Bailey ................. 210/314 |
| 4,810,372 * | 3/1989 | Jones ................... 209/315 |
| 4,836,385 * | 6/1989 | Slesarenko et al. ....... 209/315 |
| 4,861,463 * | 8/1989 | Slesarenko ............. 209/315 |
| 4,882,054 | 11/1989 | Derrick et al. .......... 210/389 |
| 4,940,500 | 7/1990 | Tadokoro et al. ......... 156/204 |
| 4,954,249 | 9/1990 | Gero et al. ............. 209/273 |
| 5,028,324 * | 7/1991 | Teinert ................. 210/232 |
| 5,139,154 | 8/1992 | Gero et al. ............. 209/273 |

(List continued on next page.)

FOREIGN PATENT DOCUMENTS

| | | | |
|---|---|---|---|
| 0074935 | 3/1983 | (EP) ............ B07B/1/50 |
| 0169698 | 1/1986 | (EP) ............ B07B/1/46 |

OTHER PUBLICATIONS

Int'l Search Report, PCT/EP99/08343.
Tuboscope's Your Single Resource For "Best In Class" Oilfield Services, Tuboscope, Inc., 1997.
Linear Motion Shale Shaker VSM 100, Thule Rigitech, 1996.
Revolutionary 50% Increase In Screen Area, Derrick Equipment Co., 1993.

(List continued on next page.)

*Primary Examiner*—Donald P. Walsh
*Assistant Examiner*—Daniel K Schlak
(74) *Attorney, Agent, or Firm*—Guy McClung

(57) ABSTRACT

A new screen has been invented for use with vibratory screening apparatuses which has, in certain aspects, a base, a first screen on the base, and a scalping screen on the first screen, the first screen assembly including a corrugated screen having alternating crests and valleys, and the second screen assembly secured to the crests of the corrugated screen, and cushion members disposed between the first and second screen assemblies, the corrugated screen of the first screen assembly having first end openings beneath valleys on two sides thereof, and end plugs within the first end openings to sealingly close off the end openings to fluid flow. The present invention has other embodiments disclosed herein from. A screening apparatus or shale shaker and methods of their use have been invented that use such screens.

32 Claims, 6 Drawing Sheets

U.S. PATENT DOCUMENTS

| | | | | |
|---|---|---|---|---|
| 5,211,291 | | 5/1993 | Kelley et al. | 209/680 |
| 5,221,008 | * | 6/1993 | Derrick, Jr. et al. | 209/269 |
| 5,385,669 | | 1/1995 | Leone, Sr. | 210/488 |
| 5,413,709 | | 5/1995 | Webb et al. | 210/255 |
| 5,417,793 | | 5/1995 | Bakula | 156/308.2 |
| 5,417,858 | * | 5/1995 | Derrick et al. | 210/388 |
| 5,417,859 | * | 5/1995 | Bakula | 210/388 |
| 5,490,598 | | 2/1996 | Adams | 209/401 |
| 5,551,575 | | 9/1996 | Leone | 209/273 |
| 5,570,749 | | 11/1996 | Reed | 175/66 |
| 5,614,094 | | 3/1997 | Deister et al. | 210/388 |
| 5,636,749 | * | 6/1997 | Wojciechowski | 209/403 |
| 5,641,070 | | 6/1997 | Seyffert | 209/314 |
| 5,641,071 | | 6/1997 | Read et al. | 209/319 |
| 5,720,881 | | 2/1998 | Derrick et al. | 210/385 |
| 5,851,393 | | 12/1998 | Car et al. | 210/489 |
| 5,853,583 | | 12/1998 | Shah | 210/340 |
| 5,876,552 | | 3/1999 | Bakula | 156/308.2 |
| 5,944,993 | | 8/1999 | Derrick et al. | |
| 5,950,841 | | 9/1999 | Knox et al. | 209/315 |
| 5,958,236 | | 9/1999 | Bakula | 210/388 |
| 5,967,336 | | 10/1999 | Baltzer et al. | 209/403 |
| 5,984,107 | | 11/1999 | Bleh | 209/320 |
| 5,992,641 | | 11/1999 | Caldwell, Jr. | 209/273 |
| 6,000,556 | | 12/1999 | Bakula | 210/388 |
| 6,000,558 | | 12/1999 | Proulx et al. | 210/486 |

OTHER PUBLICATIONS

Cascading AWD SHaker, The Double Life Corp., Inc., 1996.
Low Pressure Mud System For Deepwater Operations, Montgomery, Hart's Petroleum Int'l, pp. 59, 63–66, Dec. 1997.
Filtration & Separation, Flo Trend Systems, Inc., 1989, 10 pp.
Separation Through Technology, Composite Catalog, Brandt EPI, 1996.
Pressure Control, Solids Control, Rig Instrumentation, Swaco Geolograph, 1993.
Fluid Processing Equipment For the Drilling and Environmental Industries, Tri–Flo Int'l Inc., 1996.

* cited by examiner

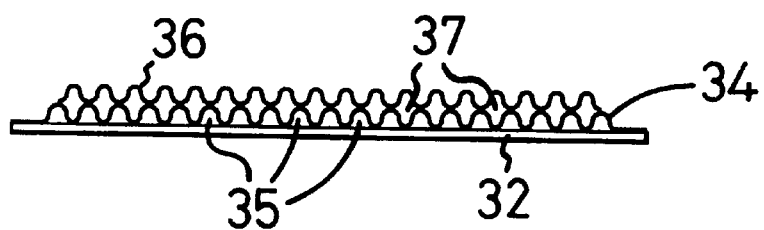
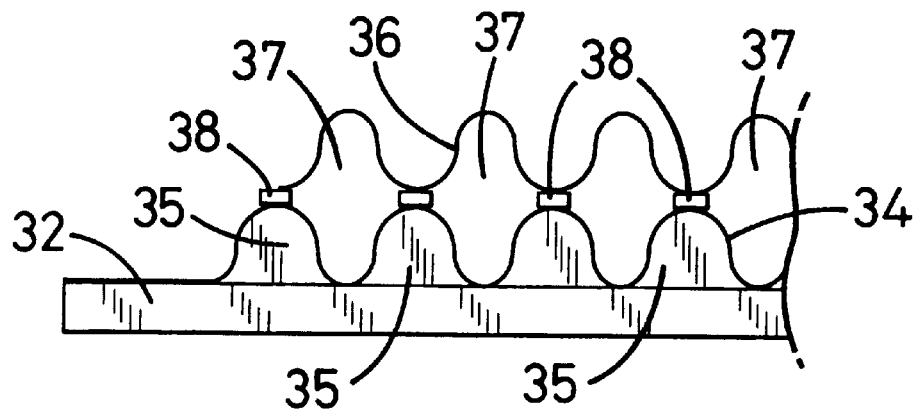
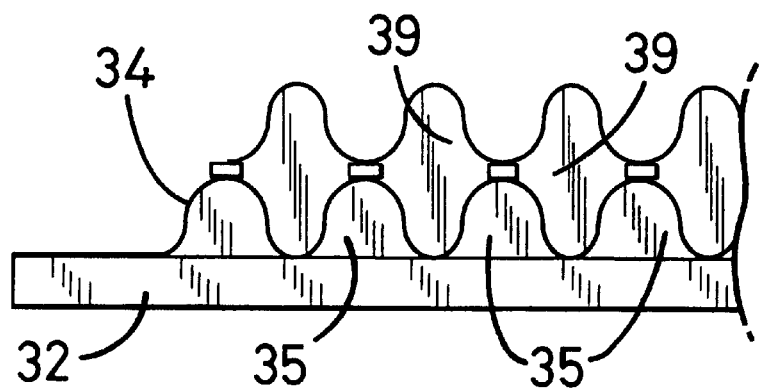

DUAL SCREEN ELEMENT HAVING UPPER SCALPING SCREEN ADHERED TO CRESTS OF CORRUGATED LOWER SCREEN

BACKGROUND OF THE INVENTION

1. Field of the Invention

The present invention is directed to screens for vibratory separators, to shale shakers with such screens, and to methods for using such screens and shakers.

2. Description of Related Art

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

FIG. 1A discloses one example of a typical prior art shaker system (e.g. as shown in U.S. Pat. No. 5,190,645). A well is being drilled by a bit carried on a string of drill pipe as drilling mud is pumped by a pump into the drill pipe and out through nozzles in the bit. The mud cools and cleans the cutters of the bit and then passes up through the well annulus flushing cuttings out with it. After the mud is removed from the well annulus, it is treated before being pumped back into the pipe. The mud enters a shale shaker where the relatively large cuttings are removed. The mud then enters a degasser where gas can be removed if necessary. The degasser may be automatically turned on and off, as needed, in response to an electric or other suitable signal produced by a computer and communicated to degasser. The computer produces the signal as a function of data from a sensor assembly associated with shale shaker. The mud then passes to a desander and (or a desilter), for removal of smaller solids picked up in the well. The mud next passes to a treating station where, if necessary conditioning media, such as barite, may be added. Suitable flow controls e.g. a valve, control the flow of media. The valve may be automatically operated by an electric or other suitable signal produced by the computer as a function of the data from sensor assembly. From the treatment station, the mud is directed to a tank from which a pump takes suction, to be re-cycled through the well. The system shown in exemplary, and it will be understood that additional components of the same types (e.g. additional treatment stations) or other types (e.g. centrifuges) could be included. Such a shale shaker or vibrator separator apparatus may employ any known screen or screens and may have a single screen or combination of two or more screens, one above the other, as is well known in the art.

In some shale shakers a fine screen cloth is used with the vibrating screen. The screen may have two or more overlying layers of screen cloth. The prior art discloses that the layers may be bonded together; and that a support, supports, or a perforated or apertured plate may be used beneath the screen or screens. The frame of the vibrating screen is resiliently suspended or mounted upon a support and is caused to vibrate by a vibrating mechanism, e.g. an unbalanced weight on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. U.S. Pat. Nos. 5,417,793; 5,417,858; and 5,417,859 disclose non-flat screens for use with shale shakers. These screens have a lower planar apertured plate with a multiplicity of spaced-apart apertures or openings therethrough. Undersides of troughs of undulating screening material are bonded to the apertured plate. Such screens present a variety of problems, deficiencies, and disadvantages, including: decreased flow area due to area occluded by solid parts of the apertured plate; necessity to either purchase relatively expensive apertured plate or provide for in-house perforating of a solid plate; plate weight increases wear on parts such as rubber screen supports or cushions and can inhibit required vibration; large plate surface area requires relatively large amount of bonding means for bonding screens to the plate; and a finished screen which is relatively heavy increases handling problems, hazards, and cost of shipping.

Vibrating screens have been employed for many years to separate particles in a wide array of industrial applications. One common application of vibrating screens is in drilling operations to separate particles suspended in drilling fluids. The screens are generally flat and are mounted generally horizontally on a vibrating mechanism or shaker that imparts either a rapidly reciprocating linear, elliptical or circular motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a pan beneath the screen.

A vibrating screen may be formed from one or more layers of wire mesh. Wire mesh is generally described with reference to the diameter of the wires from which it is woven, the number wires per unit length (called a mesh count) and the shape or size of the openings between wires. Wire mesh comes in various grades. "Market" grade mesh generally has wires of relative large diameter. "Mill" grade has comparatively smaller diameter wires and "bolting cloth" has the smallest diameter wire. The type of mesh chosen depends on the application. Smaller diameter wires have less surface and thus less drag, resulting in greater flow rates. Smaller diameter wires also result, for a given opening size, in a larger percentage of open area over the total area of the screen, thus allowing greater flow rates and increased capacity. However, screens of bolting cloth tears more easily than market or mill grade screens, especially when used in harsh conditions such as drilling and mining operations. The smaller diameter wires tend to have less tensile strength and break more easily, and the finer mesh also tends not to retain its shape well.

Most meshes suffer from what is termed as "near sized" particle blinding. During vibration, wires separate enough to allow particles of substantially the same size or slightly larger than the openings to fall between the wires and become wedged, thus "blinding" the openings of the screen and reducing capacity of the screen. If a particle becomes lodged when the wires are at a maximum distance apart, it is almost impossible to dislodge the particle. Sometimes, however, wires will subsequently separate further to release the lodged particle. Unfortunately, some wire mesh, especially bolting cloth, is tensioned. Tensioning restricts movement of the wires. Restricting movement assists in holding the shape of the wire mesh, keeping the size of the openings consistent to create a more consistent or finer "cutting point" and reducing abrasion from wires rubbing against each other. However, restricted movement of the wires reduces the probability that, once a near sized particle becomes stuck, the wires will subsequently separate to allow the particle to pass. Use of smaller diameter wires, with smaller profiles, helps to reduce blinding. With a smaller diameter wire, a particle is less likely to become lodged midway through the opening.

U.S. Pat. No. 4,033,865, describes layering two meshes in a manner that results in at least one wire of the lower of the two meshes bisecting each opening in the upper mesh. The openings in each mesh are at least twice as wide as the diameters of the wires and the lower mesh has openings the same size as or slightly larger than the openings in the upper mesh. The lower mesh, when held tightly against the upper mesh, prevents particles from migrating far enough into an opening in the upper mesh to be trapped. Some relative movement of the layers also helps to dislodge particles caught in the upper layer. The two-layer arrangement provides a finer "cutting point," allowing smaller particles to be separated out. A third "backing" layer of relatively coarse, mill grade mesh is often used to carry most of the load on the screen and to increase the tensile strength of the screen.

Certain prior art vibratory separators use a scalping screen mounted above one or more finer mesh screens. The coarser mesh of the scalping screen removes relatively large particles, reducing the loading on the fine mesh screen(s), prolonging wire mesh life, particularly fine wire mesh; and reducing the solids bed through which material passes to get to a screen. However, this results in a separator with a relatively large height and can result in flow problems.

Blinding of the screens reduces the flow capacity of the screen. Although capacity can be increased by increasing the total area the screens, the size of the screen is limited in most applications, such as on drilling rigs, especially those on offshore platforms. There has thus been generally a trade-off between capacity, longevity, repairability and resistance to blinding of the screens.

There is a need for a screen (and a shaker or vibratory separator using it) which protects finer mesh screens from larger, more abrasive particles. There is a need for such a screen which increases liquid flow-through and has increased rigidity. There is need for such a screen with which impact load at a feed entrance is reduced, increasing screen life.

SUMMARY OF THE PRESENT INVENTION

The present invention discloses, in certain embodiments; a screen for vibrating screen apparatus; vibrating screen apparatus with such a screen; a methods of their use.

The present invention, in certain aspects, discloses a screen for a vibratory separator apparatus, the screen including a base (or frame or support), a first screen assembly on the base, and a second screen assembly mounted on and above the first screen assembly (either mounted to the first screen or on apparatus or structure so it is above the first screen, wherein the second screen assembly includes a scalping screen of a larger mesh size than a mesh size of a screen of the first screen assembly.

Such a screen may have some, any, or all of these features: the first screen assembly including a corrugated screen having alternating crests and valleys; the second screen assembly secured to the crests of the corrugated screen; a cushion member or members disposed between the first and second screen assemblies; wherein the first screen assembly includes a corrugated screen having alternating crests and valleys and the cushion member(s) are between crests of the corrugated screen and the second screen assembly; wherein the second screen assembly includes a corrugated screen having alternating crests and valleys and the cushion member(s) are between crests of the corrugated screen of the first screen assembly and valleys of the corrugated screen of the second screen assembly; wherein the cushion member(s) are secured to the corrugated screen of the first screen assembly; wherein the cushion member(s) are secured to the corrugated screen of the second screen assembly; wherein the cushion member(s) are secured to the corrugated screen of the first and second screen assembly; including cushion member(s) between the first and second screen assemblies extending along two spaced apart sides thereof; wherein the first screen assembly includes a plurality of screens; wherein the plurality of screens is at least two screens one on top of the other, the at least two screens bonded together; wherein the base is a frame; wherein the base is a series of straps; wherein the base is a perforated plate; wherein the second screen assembly is a substantially flat screen; wherein the second screen assembly includes at least two screens; the corrugated screen of the first screen assembly having first end openings beneath valleys on one or two sides or ends thereof, and end plugs within the first end openings on one or two sides or ends to sealingly close off the end openings to fluid flow; wherein both the first and second screen assemblies have at least one corrugated screen with crests and valleys and end screen openings are defined between and at ends of the two screen assemblies, the screen further having opening plugs within the end screen openings to sealingly close off the end screen openings to fluid flow; and/or the corrugated screen of the first screen assembly having first end openings beneath valleys on one or two sides or ends thereof, and end plugs within the first end openings on one or two sides or ends to sealingly close off the end openings to fluid flow.

The present invention provides in certain aspects a vibratory shaker system with a basket for mounting at least one screen for screening fluid introduced thereon, vibrator apparatus connected to the basket for vibrating the basket and the at least one screen, the at least one screen like any screen disclosed herein and, in one aspect, the screen having a base (frame or support), a first screen assembly on the base, and a second screen assembly mounted on and above the first screen assembly, wherein the second screen assembly includes a scalping screen of a larger mesh size than a mesh size of a screen of the first screen assembly.

It is within the scope of certain particular embodiments of this invention to provide an improvement of screens disclosed in U.S. Pat. Nos. 5,417,793; 5,417,858; 5,417,859; and 5,720,881. The improved screen has at least one upper screen, e.g. but not limited to, at least one upper scalping screen as disclosed herein.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, non-obvious screens, screens for vibratory separators and separator with such screens;

Such screens which overcome the problems, limitations and disadvantages of various prior art screens;

Such a screen with at least one upper scalping screen or mesh;

Such a screen with lower three-dimensional mesh, meshes, screen, and/or screens, in one aspect undulating, and, in one particular aspect, with the upper scalping screen bonded to the mesh, etc.; and A shale shaker or vibratory separator with one or more such screens.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 5C is an end view of the screen of FIG. 5A.

FIG. 5D is an enlargement of a portion of the screen shown in FIG. 5C.

FIG. 5E is an end view that shows an alternative structure for the screen of FIG. 5A.

DESCRIPTION OF EMBODIMENTS PREFERRED AT THE TIME OF FILING FOR THIS PATENT

Figure 2A:
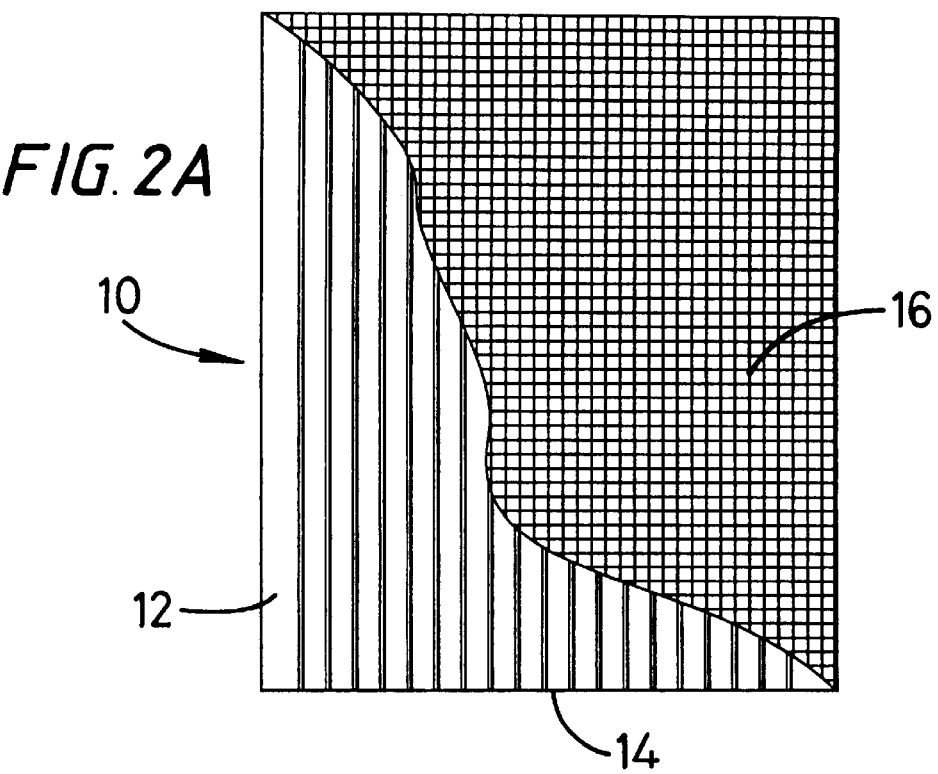
FIG. 2A is a top view partially cut-away of a screen according to the present invention.

FIG. 2A shows a screen 10 according to the present invention with a lower base, support or frame 12, three undulating mesh screens 14 on and/or bonded to the frame 12, and an upper mesh or screen 16. The screens 14 may themselves be bonded together, e.g. with epoxy, welding, and/or sintering. Rubber strips, plastic strips tape, cushion or cushions 18 are positioned between the screen 14 and the upper screen 16. The strip(s) or cushion(s) are optional. As shown the strip(s), tape(s), or cushion(s) 18 are secured to the screen 14 (or to crests thereof), but it is within the scope of this invention to secure them (or some of them) to the screen 16. To effect such securement any suitable glue, epoxy, weld, and/or sintering may be employed. The frame 12 may be any suitable known base, frame or support.

Figure 2B:
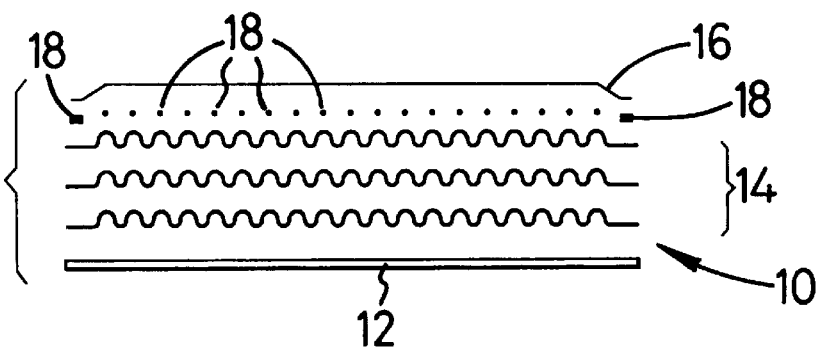
FIG. 2B is an exploded view of the screen of FIG. 2C.
Figure 2C:
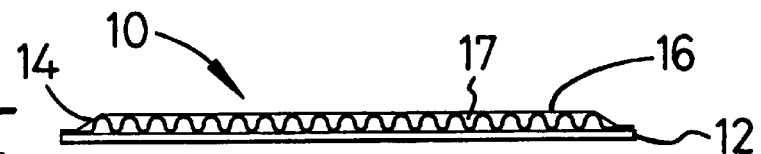
FIG. 2C is an end view of the screen of FIG. 2A.

It is within the scope of this invention for the screen 14 to be any known screen, mesh, screens, meshes, or combination thereof, bonded together, unbonded, or bonded at only certain locations and with any known shape as viewed either from above or on end (as in FIG. 2A). It is within the scope of this invention for the upper screen 16 to be any known screen, mesh, screens, meshes, or combination thereof, bonded together or unbonded, and with any known shape. As shown in FIG. 2B, the screen 14 is three mesh screens bonded together with coarser mesh on the bottom, medium mesh in the middle, and finer mesh on top. The screen 16 as shown may be a scalping screen of a mesh coarser than the finest mesh of the screen 14 or of a multi-layer coarser mesh. In another aspect the screen 14 is a single screen of closely woven mesh made of any suitable material, e.g. stainless steel and/or plastic material and the screen 16 is a single screen of coarser mesh made of any suitable material (e.g. but not limited to stainless steel and/or plastic), with the screen 14 on a metal or plastic frame or support. Alternatively or additionally, instead of the frame 12 any known perforated plate, strip, or series of straps or strips may be used. A series of strips is not legally equivalent to a perforated plate.

In one aspect the strips 18 are fused plastic strips aligned with peaks of the undulating fine mesh. Such strips may be made of rubber (e.g. nitrile) or plastic, e.g. polypropylene, to inhibit or prevent abrasion of the finer meshes. Such strips can be glued to the bottom of the screen 16 and/or the screen 14. Also the screen 16 can be glued to the screen 14.

Figure 2D:
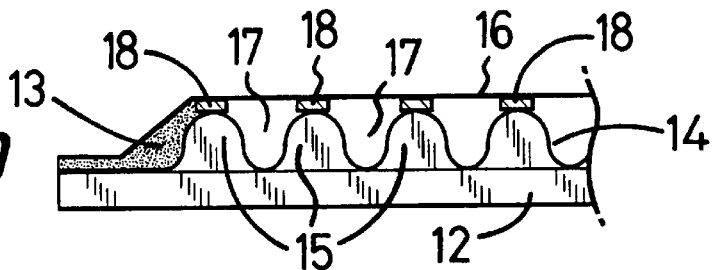
FIG. 2D is an enlargement of part of the screen of FIG. 2C.

End plugs 13 and 15 (FIG. 2D) sealingly close off open ends of the screen 10. These end plugs may be made of rubber, metal, wood, plastic, Teflon™ material, or urethane. The plugs 13 extend along two sides of the screen along crests of the screening material to completely seal the sides. The plugs are held in place by friction fit, glue, epoxy, welding and/or sintering. Alternatively, the ends may be covered with screen material.

Fluid flow on the screen 10 from either end may be from top-to-bottom as viewed in FIG. 2A, bottom-to-top, or from one side to the other.

In one aspect the screen 16 is a scalping screen of woven steel mesh. In another aspect, it is woven plastic or synthetic or composite mesh; and in another aspect it is a combination of woven steel and woven plastic or synthetic or composite mesh. The screen 16 may be the same mesh or coarser mesh than that of the screen 14 or of any layer thereof.

In this embodiment the areas 17 between the screen 16 and the screen 14 are open. The screen 16 protects the mesh of the screen 14 from abrasive particles. When the screen 16 is of a coarser mesh than that of the screen 14, relatively larger particles retained on the screen 16 are prevented from damaging and/or hindering flow through the screen 14.

With the screen 10 as shown liquid flow through the screen is increased by reducing the thickness of the solids bed of the finer mesh screens by the separation of larger particles with the screen 16.

Use of the upper screen 16 increases stability and rigidity of the screen 10, improving solids conveyance across and off, rather than through the screen 16 thereby facilitating liquid flow through the screen. Solids that do not flow through the screen 16 do not encounter the lower finer mesh screens and do not reduce flow through the finer mesh screens. Use of the upper screen 16 also reduces the initial impact load of flow onto the screen 14 at a feed entrance to the screen, thereby extending screen life.

Figure 3:
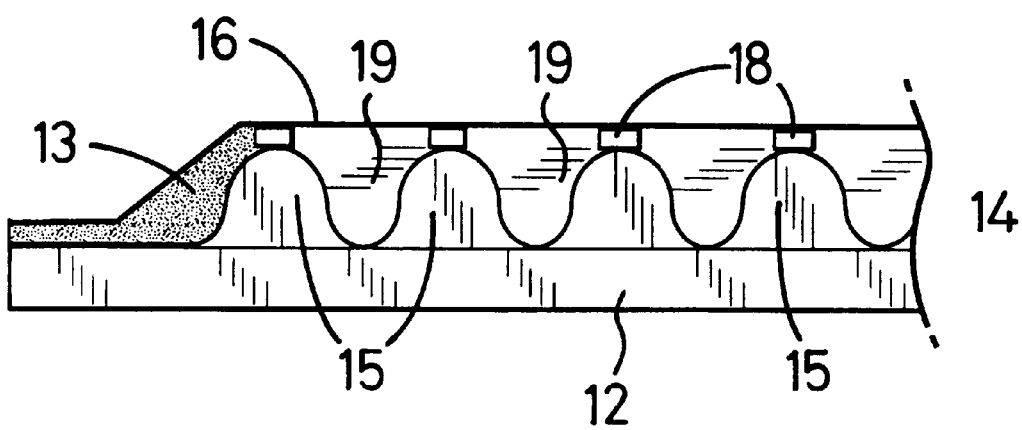
FIG. 3 is an end view in cross section of an alternative embodiment of the screen of FIG. 2A.

FIG. 3 shows an alternative embodiment of the screen 10 with identical parts (indicated by the same numerals) but with additional end plugs 19 between the upper screen 16 and the screen 14. Such "double plugging" may be used on either or both screen ends. A fluid and/or particles introduced to the screen 10 first encounters the screen 16 and then material flowing through the screen 16 flows to the screen 14. The plugs 19 may be made of the materials described for the plugs 13, 15 and the plugs 19 may be similarly installed and/or secured in place. Any of the plugs 13, 15, 19 may be deleted in certain embodiments.

Figure 4:
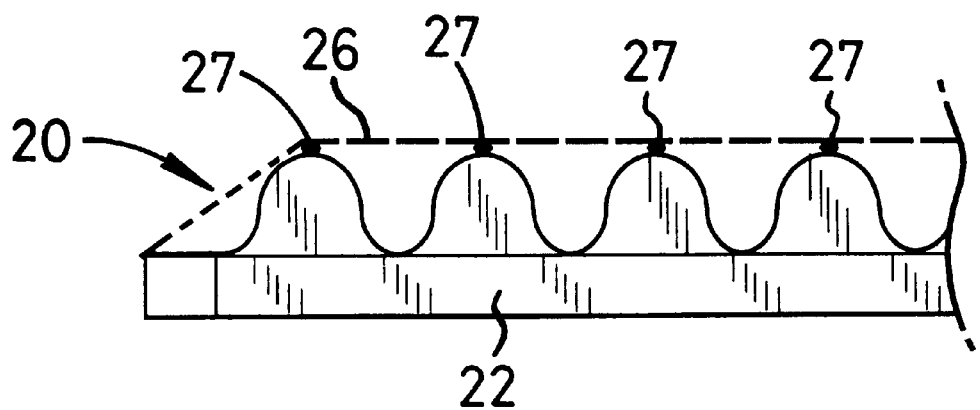
FIG. 4 is an end view of a screen according to the present invention.

FIG. 4 shows a screen 20 like the screen 10, but without the cushion members 18. A scalping screen 26 is secured at points 27 to a screen 24 on a base, frame, or support 22. The screens 24, 26 may be in any of the forms discussed above for the screens 14, 16, respectively and the base, frame, or support 22 may have any of the forms or alternatives discussed above for the base, frame, or support 12. The screen 26 may be secured to the screen 24 in any suitable way, including but not limited to with glue, epoxy, fused plastic and/or by welding and/or sintering.

Figure 5A:
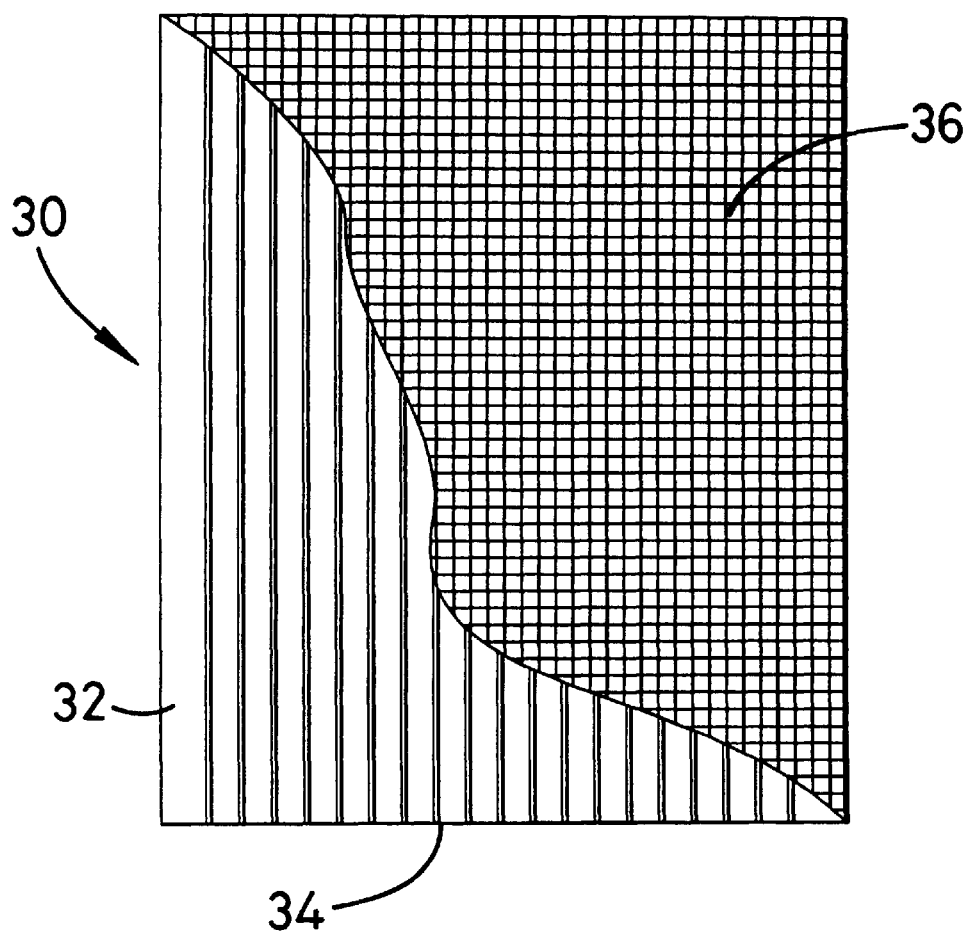
FIG. 5A is a top view of a screen according to the present invention.
Figure 5B:
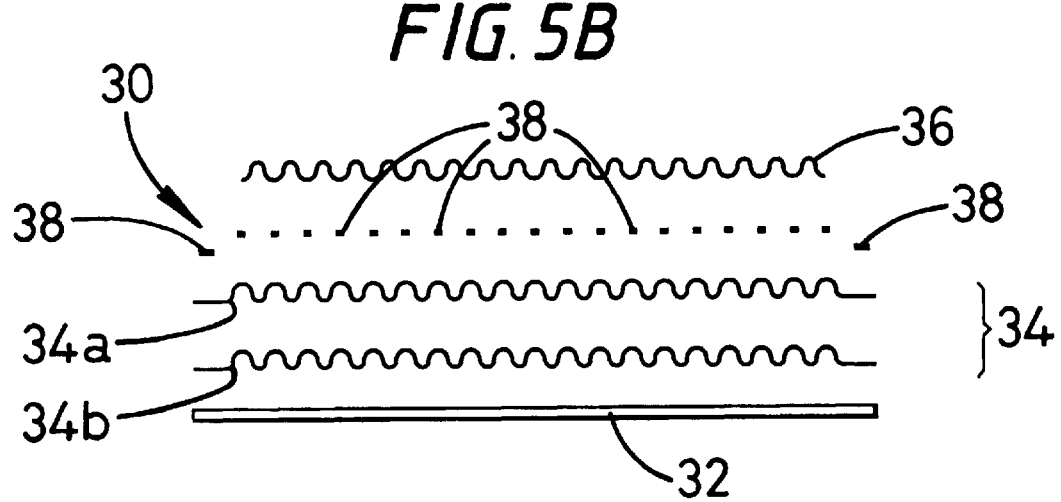
FIG. 5B is an exploded view.

FIG. 5A shows a screen 30 with a base, frame, or support 32 on which is a screen 34 to which is secured a corrugated upper screen 36 with optional items 38 (like the tape, cushion, strips 18, above). In one aspect the screens 34 and 36 are of different mesh; in one aspect with coarser mesh in the screen 36; and in another aspect the two screens are of a similar mesh. The screens 34, 36 may be like the screens 14, 16 and 24, 26 respectively with respect to mesh size and materials. The base, frame, or support 32 may be like the items 12, 22 and their alternatives described above. As shown the screen 34 includes a fine mesh screen 34a on top of a coarser mesh screen 34b. A third screen (not shown) of medium mesh (e.g. as in FIG. 2B) may be used. If used, the upper screen 36 may be secured to or simply rest on the items 38 and the lower screen 34 may be secured to or simply rest beneath the items 38. It is to be understood that the items 38 represent any of the strip(s), tape, etc. described above regarding the items 18.

End plugs 35 (FIGS. 5C, 5D) sealingly shut off the end openings beneath corrugations of the screen 34. Open areas 37 extend between the screens 34, 36. Fluid flow on the screen 30 may be top-to-bottom as viewed in FIG. 5A, bottom-to-top, or from one side to another.

FIG. 5E shows an alternative embodiment of the screen 30 with plugs 39 sealingly closing off the ends of the areas 37 to fluid flow. The plugs 35, 39 may be like, and installed as, any of the plugs described above.

The screens in FIGS. 2A–5E have the advantages of an upper screen as described for the screen 10.

Figure 1A:
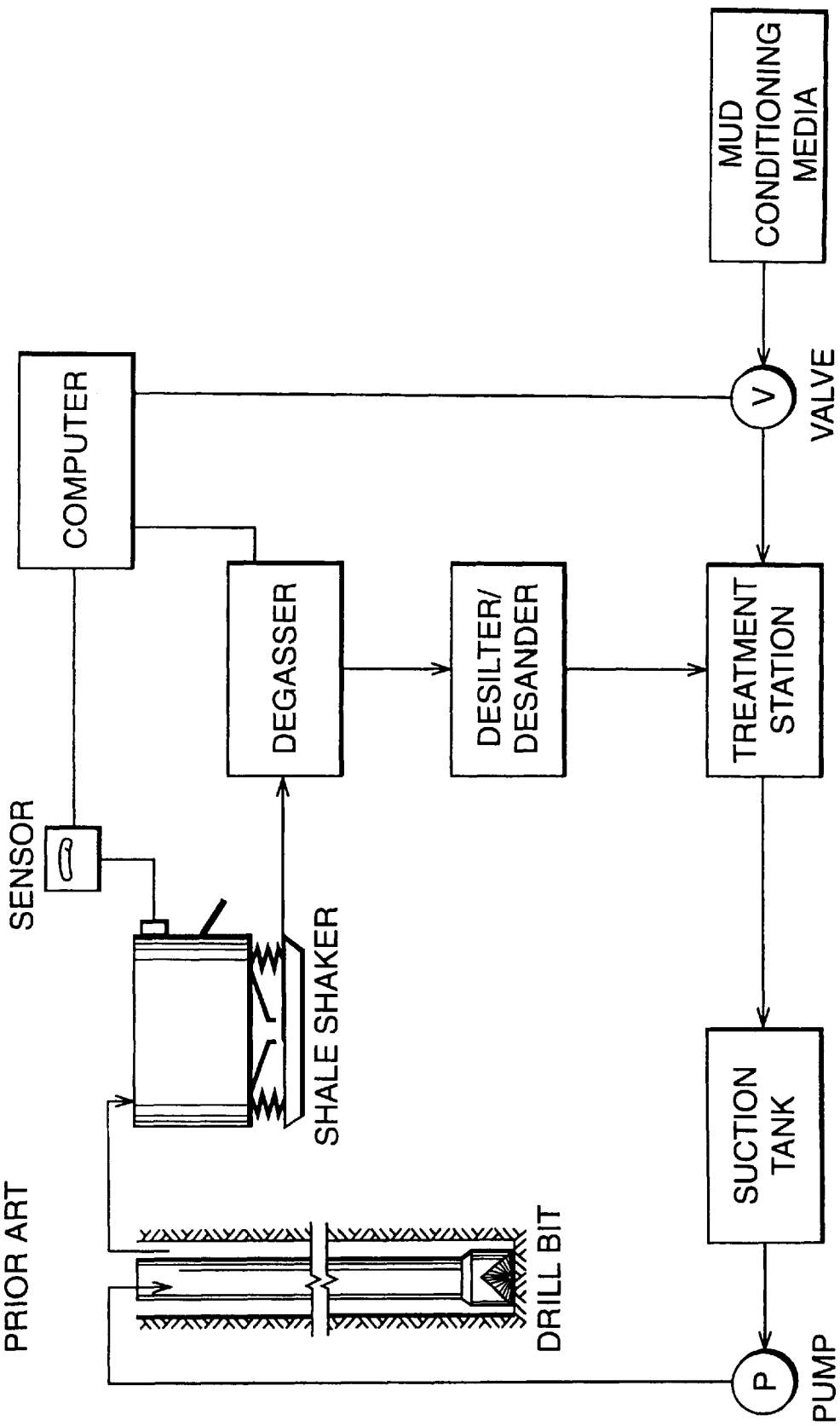
FIG. 1A is a schematic view of a prior art system.
Figure 1B:
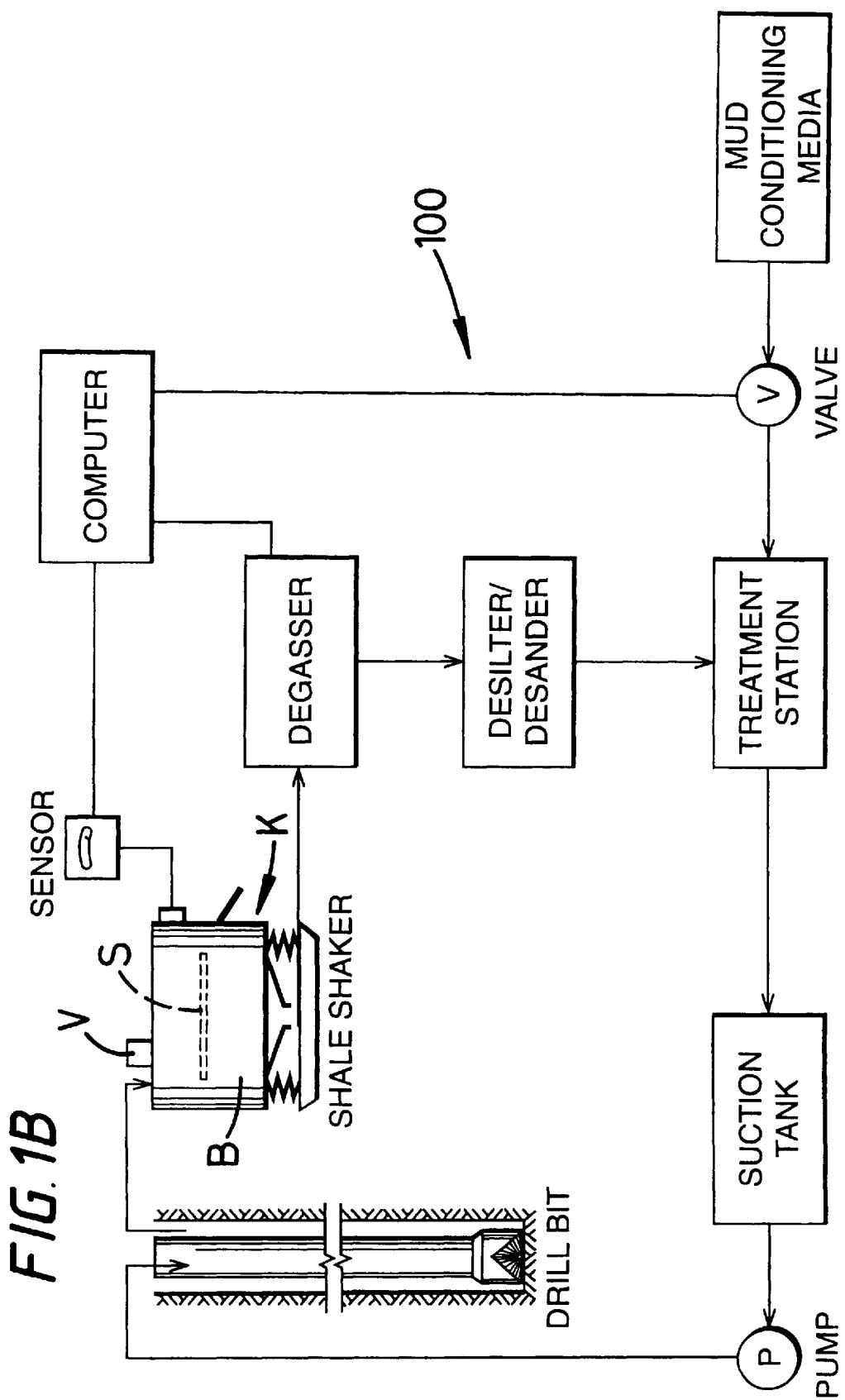
FIG. 1B is a schematic view of a system according to the present invention.

FIG. 1B shows a system 100 according to the present invention with parts like those of the system of FIG. 1A; but with a shale shaker K having a screen or screens S according to the present invention (any screen or screens disclosed herein). The screen(s) S are mounted in a typical shaker basket B and one or more vibrators V (any known suitable shaker vibrator) vibrate the basket B and hence the screen(s) S.

The present invention, therefore, discloses a screen for a vibratory separator apparatus, the screen including a base (or frame or support), a first screen assembly on the base, and a second screen assembly mounted on and above the first screen assembly (either mounted to the first screen or on apparatus or structure so it is above the first screen, wherein the second screen assembly includes a scalping screen of a larger mesh size than a mesh size of a screen of the first screen assembly. Such a screen may have some, any, or all of these features: the first screen assembly including a corrugated screen having alternating crests and valleys; the second screen assembly secured to the crests of the corrugated screen; a cushion member or members disposed between the first and second screen assemblies; wherein the first screen assembly includes a corrugated screen having alternating crests and valleys and the cushion member(s) are between crests of the corrugated screen and the second screen assembly; wherein the second screen assembly includes a corrugated screen having alternating crests and valleys and the cushion member(s) are between crests of the corrugated screen of the first screen assembly and valleys of the corrugated screen of the second screen assembly; wherein the cushion member(s) are secured to the corrugated screen of the first screen assembly; wherein the cushion member(s) are secured to the corrugated screen of the second screen assembly; wherein the cushion member(s) are secured to the corrugated screen of the first and second screen assembly; including cushion member(s) between the first and second screen assemblies extending along two spaced apart sides thereof; wherein the first screen assembly includes a plurality of screens; wherein the plurality of screens is at least two screens one on top of the other, the at least two screens bonded together; wherein the base is a frame; wherein the base is a series of straps; wherein the base is a perforated plate; wherein the second screen assembly is a substantially flat screen; wherein the second screen assembly includes at least two screens; the corrugated screen of the first screen assembly having first end openings beneath valleys on one or two sides or ends thereof, and end plugs within the first end openings on one or two sides or ends to sealingly close off the end openings to fluid flow; wherein both the first and second screen assemblies have at least one corrugated screen with crests and valleys and end screen openings are defined between and at ends of the two screen assemblies, the screen further having opening plugs within the end screen openings to sealingly close off the end screen openings to fluid flow; and/or the corrugated screen of the first screen assembly having first end openings beneath valleys on one or two sides or ends thereof, and end plugs within the first end openings on one or two sides or ends to sealingly close off the end openings to fluid flow.

The present invention, therefore, provides in certain aspects a vibratory shaker system with a basket for mounting at least one screen for screening fluid introduced thereon, vibrator apparatus connected to the basket for vibrating the basket and the at least one screen, the at least one screen like any screen disclosed herein and, in one aspect, a base (frame or support), a first screen assembly on the base, and a second screen assembly mounted on and above the first screen assembly, wherein the second screen assembly includes a scalping screen of a larger mesh size than a mesh size of a screen of the first screen assembly.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A screen for a vibratory separator apparatus, the screen comprising;
   a base,
   a first screen assembly on the base, and
   a second screen assembly mounted on and above the first screen assembly,
   wherein the second screen assembly includes a scalping screen of a larger mesh size than a mesh size of a screen of the first screen assembly,
   cushion members disposed between the first and second screen assemblies,
   wherein the first and second screen assemblies each include a corrugated screen having alternating crests and valleys and the cushion members are between the crests of the corrugated screen of the first screen assembly and the valleys of the corrugated screen of the second screen assembly.

2. The screen of claim 1 further wherein
   the second screen assembly is secured to the crests of the corrugated screen of the first screen assembly.

3. The screen of claim 1 wherein the cushion members are secured to the corrugated screen of the first screen assembly.

4. The screen of claim 1 wherein the cushion members are secured to the corrugated screen of the second screen assembly.

5. The screen of claim 1 wherein the cushion members are secured to the corrugated screens of the first and second screen assemblies.

6. The screen of claim 1 including cushion members between the first and second screen assemblies extending along two spaced apart sides thereof.

7. The screen of claim 1 wherein the first screen assembly includes a plurality of screens.

8. The screen of claim 7 wherein the plurality of screens is at least two screens one on top of the other, the at least two screens bonded together.

9. The screen of claim 1 wherein the base is a frame.

10. The screen of claim 1 wherein the base is a series of straps.

11. The screen of claim 1 wherein the base is a perforated plate.

12. The screen of claim 1 wherein the second screen assembly includes at least two screens.

13. The screen of claim 1 further comprising
    the corrugated screen of the first screen assembly having first end openings beneath crests on two sides thereof, and
    end plugs within the first end openings to sealingly close off the end openings to fluid flow.

14. The screen of claim 1 wherein end screen openings are defined between and at ends of the two screen assemblies, the screen further comprising opening plugs within the end screen openings to sealingly close off the end screen openings to fluid flow.

15. The screen of claim 14 further comprising
    the corrugated screen of the first screen assembly having first end openings beneath crests on two sides thereof, and
    end plugs within the first end openings to sealingly close off the end openings to fluid flow.

16. A vibratory shaker system comprising
    a basket for mounting at least one screen for screening fluid introduced thereon,
    vibrator apparatus connected to the basket for vibrating the basket and the at least one screen,
    the at least one screen comprising;
    a base,
    a first screen assembly on the base, and
    a second screen assembly mounted on and above the first screen assembly,
    wherein the second screen assembly includes a scalping screen of a larger mesh size than a mesh size of a screen of the first screen assembly, cushion members disposed between the first and second screen assemblies,
    wherein the first and second screen assemblies each include a corrugated screen having alternating crests and valleys and the cushion members are between crests of the corrugated screen of the first screen assembly and the valleys of the corrugated screen of the second screen assembly.

17. A screen for a vibratory separator apparatus, the screen comprising;
    a base
    a first screen assembly on the base,
    a second screen assembly mounted on and above the first screen assembly, wherein the second screen assembly includes a scalping screen of a larger mesh size than a mesh size of a screen of the first screen assembly, wherein both the first and second screen assemblies have at least one corrugated screen with crests and valleys and end screen openings are defined between and at ends of the two screen assemblies, the screen further comprising opening plugs within the end screen openings to sealingly close off the end screen openings to fluid flow.

18. The screen of claim 17 wherein the second screen assembly is secured to the crests of the corrugated screen of the first screen assembly.

19. The screen of claim 17 further comprising cushion members disposed between the first and second screen assemblies.

20. The screen of claim 19 wherein the cushion members are between crests of the corrugated screen of the first screen assembly and the second screen assembly.

21. The screen of claim 20 wherein the cushion members are between crests of the corrugated screen of the first screen assembly and valleys of the corrugated screen of the second screen assembly.

22. The screen of claim 21 wherein the cushion members are secured to the corrugated screen of the first screen assembly.

23. The screen of claim 21 wherein the cushion members are secured to the corrugated screen of the second screen assembly.

24. The screen of claim 21 wherein the cushion members are secured to corrugated screens of both screen assemblies.

25. The screen of claim 19 including cushion members between the first and second screen assemblies extending along two spaced apart sides thereof.

26. The screen of claim 17 wherein the first screen assembly includes a plurality of screens.

27. The screen of claim 26 wherein the plurality of screens is at least two screens one on top of the other, the at least two screens bonded together.

28. The screen of claim 17 wherein the base is a frame.

29. The screen of claim 17 wherein the base is a series of straps.

30. The screen of claim 17 wherein the base is a perforated plate.

31. The screen of claim 17 wherein the second screen assembly includes at least two screens.

32. A vibratory shaker system comprising a basket for mounting at least one screen for screening fluid introduced thereon, vibrator apparatus connected to the basket for vibrating the basket and the at least one screen, the at least one screen comprising a base, a first screen assembly on the base, and a second screen assembly mounted on and above the first screen assembly, wherein the second screen assembly includes a scalping screen of a larger mesh size than a mesh size of a screen of the first screen assembly, wherein both the first and second screen assemblies have at least one corrugated screen with crests and valleys and end screen openings are defined between and at ends of the two screen assemblies, the screen further comprising opening plugs within the end screen openings to sealingly close off the end screen openings to fluid flow.

* * * * *